United States Patent [19]

Cheng

[11] Patent Number: 4,789,838
[45] Date of Patent: Dec. 6, 1988

[54] PULSE DETECTION CIRCUIT USING AMPLITUDE AND TIME QUALIFICATION

[76] Inventor: Jyi-Min Cheng, 6997 Blue Hill Dr., San Jose, Calif. 95129

[21] Appl. No.: 28,926

[22] Filed: Mar. 23, 1987

[51] Int. Cl.⁴ .......................................... H03K 5/153
[52] U.S. Cl. ................... 328/150; 307/350; 307/351; 328/117; 328/119; 328/164
[58] Field of Search ............. 307/268, 350, 351, 354; 328/117, 119, 150, 164

[56] References Cited

U.S. PATENT DOCUMENTS

| | | | |
|---|---|---|---|
| 3,252,099 | 5/1966 | Dodd | 328/164 |
| 3,760,282 | 9/1973 | Arnold et al. | 328/150 |
| 3,979,771 | 9/1976 | Taggart, Jr. et al. | |
| 4,001,884 | 1/1977 | Herbst et al. | |
| 4,090,144 | 5/1978 | Jenik et al. | 328/150 |
| 4,141,046 | 2/1979 | Brown | |
| 4,141,494 | 2/1979 | Fisher | 307/351 |
| 4,281,356 | 7/1981 | Sousa | |
| 4,306,194 | 12/1981 | Chapman | 328/150 |
| 4,346,411 | 8/1982 | Buhler et al. | |
| 4,399,474 | 8/1983 | Coleman, Jr. | |
| 4,495,529 | 1/1985 | Gustafson | |
| 4,528,601 | 7/1985 | Moriyama et al. | |
| 4,532,559 | 7/1985 | Long et al. | |
| 4,550,391 | 10/1985 | Chung et al. | |
| 4,580,278 | 4/1986 | Yamamoto | |
| 4,634,896 | 1/1987 | Shrinkle | 328/164 |

FOREIGN PATENT DOCUMENTS 0034055 8/1981 European Pat. Off. .
2062421 5/1984 United Kingdom .

Primary Examiner—John Zazworsky
Attorney, Agent, or Firm—Townsend and Townsend

[57] ABSTRACT

A magnetic recording pulse detection circuit using a combination of amplitude and time qualification. An input signal is provided to a peak detecting circuit and to a comparator for comparing the input signal to a threshold level. A time delay circuit is also provided so that a peak detection output signal is provided only if the peak exceeds the threshold value and there has been no additional peak for a predetermined period of time.

10 Claims, 3 Drawing Sheets

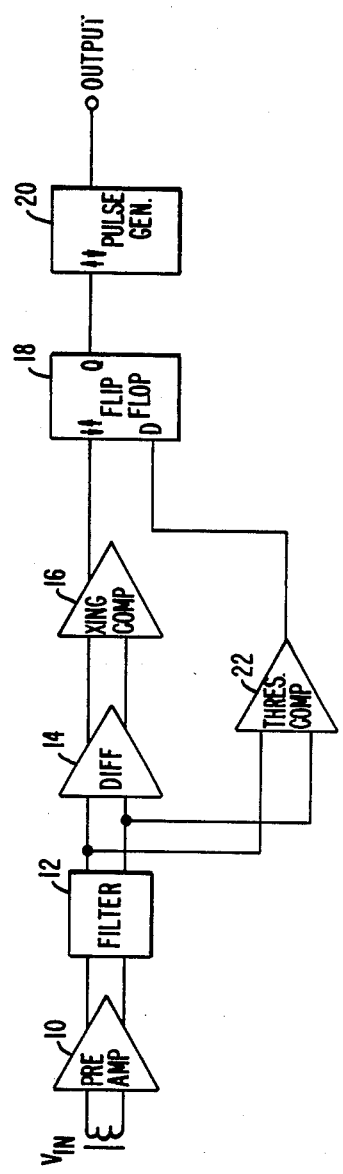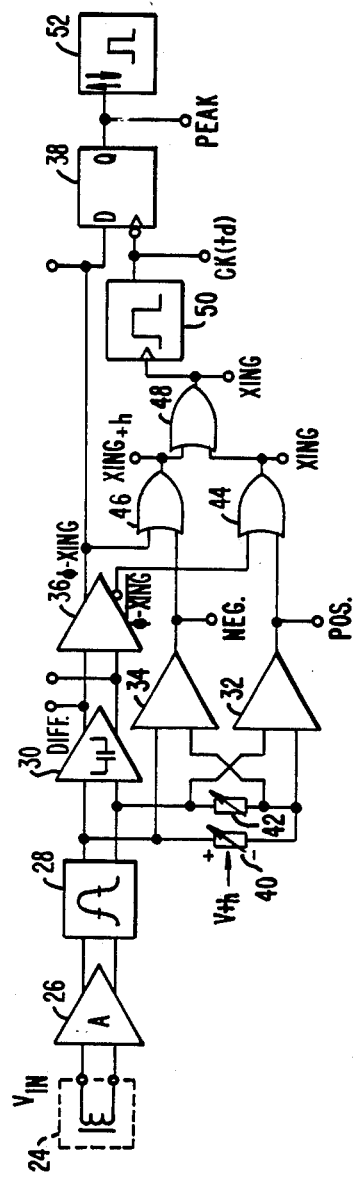

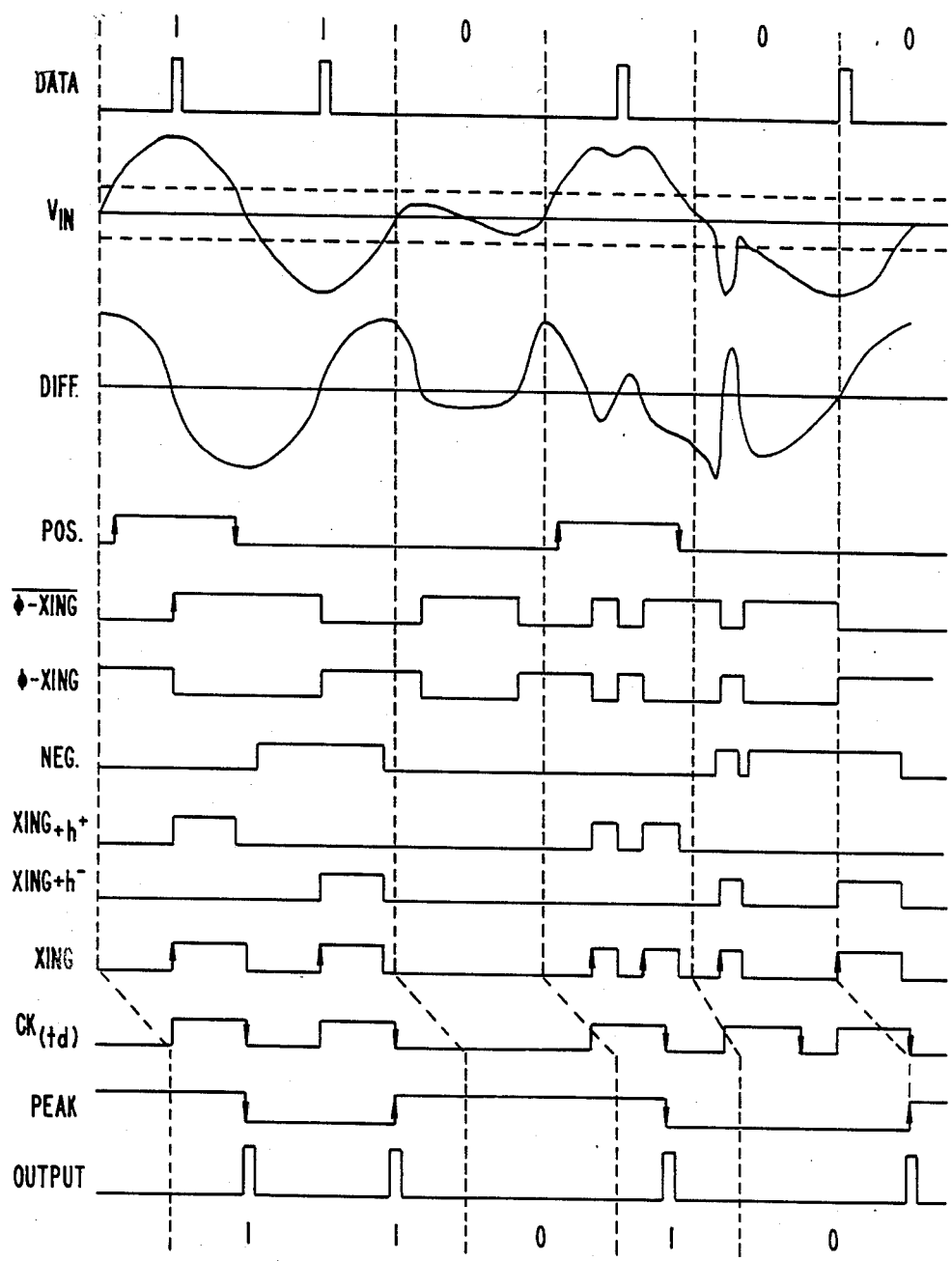
FIG._3.

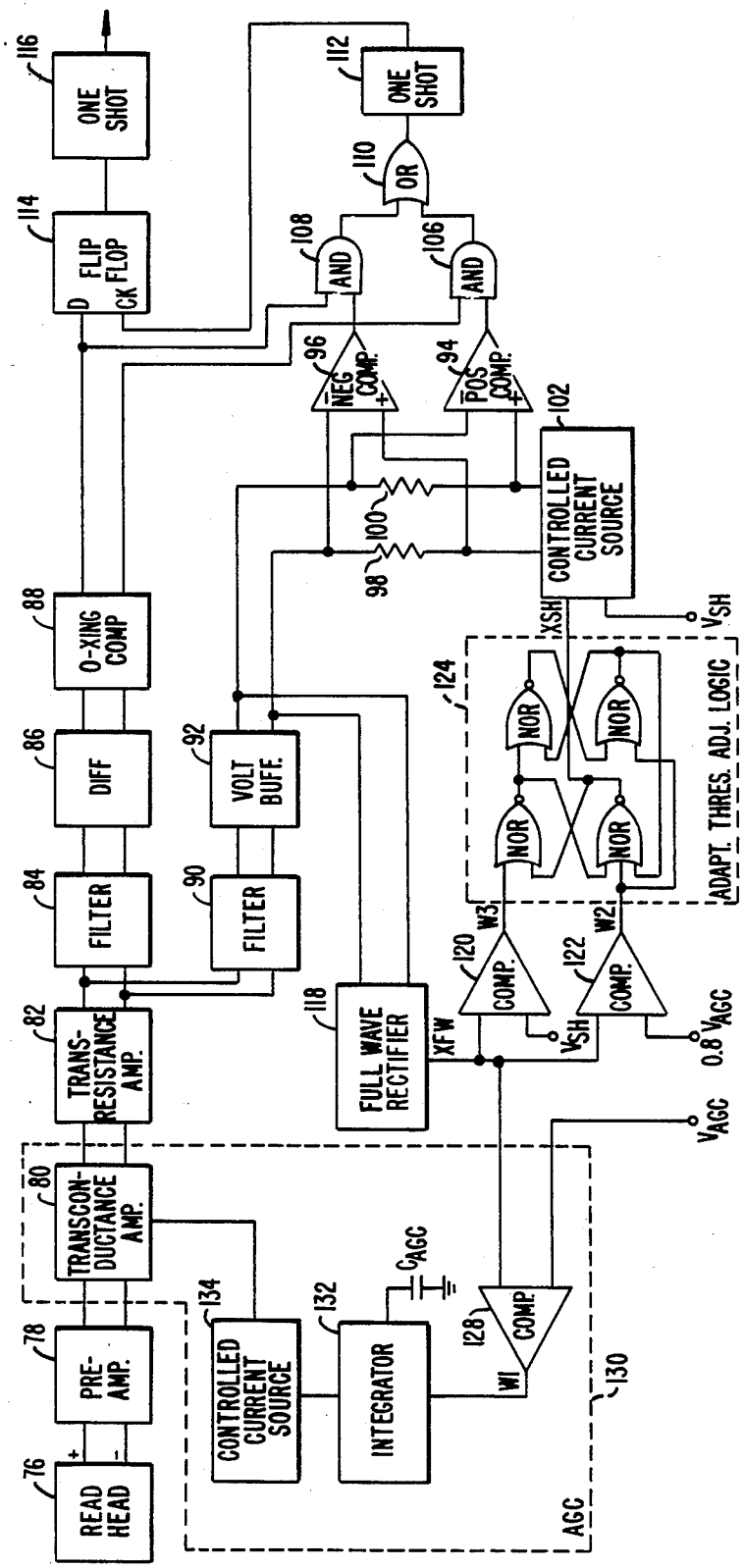
FIG._4.

PULSE DETECTION CIRCUIT USING AMPLITUDE AND TIME QUALIFICATION

BACKGROUND

The present invention relates to magnetic recording pulse detection systems and, more particularly, to such systems using peak qualification.

Binary data is stored on magnetic media (disk) by applying a magnetic flux whose polarity reverses with each consecutive data pulse. The analogue signal read back from the disk consists of a series of peaks corresponding to the flux reversals on the magnetic medium which represent the stored original binary data.

For error free reconstruction of the data, the time position of the peak must be found and a digital output pulse produced in response with no change in the timing relationships. The detection techniques are complicated because the shape of the analogue signal varies with different heads, media, head/track alignment and read circuitry non-linearity. Additionally, the stored bit density increases towards the inner tracks and so the signal amplitude decreases with significant bit-interaction, resulting in more distortion and bit shifting.

Typical encoding techniques such as MFM (Modified Frequency Modulation) contain mainly three frequency components, f, 1.5 f and 2 f. Since consecutive data pulses cause flux reversals, the analogue read signal maximum frequency is always half that of the binary data. Optimally, the recorded waveform is adjusted so that at maximum frequency, 2 f, it is sinusoidal. However, at lower frequencies the waveform will go through points of inflexion, or shoulders, which cause peak detection problems.

A typical pulse detector is shown in FIG. 1 and consists of a wide-band amplifier 10, a low-pass filter 12, a differentiator 14, a zero-crossing comparator 16 and a bi-directional pulse generator 20. After amplification and low-pass filtering, the signal is differentiated to find the peaks. The zero-crossing caused by the differentiated peak is located by comparator 16 and an output pulse is generated by pulse generator 20. A flip-flop 18 may be added as discussed below. The input to pulse generator 20 is bi-directional so that both flux polarities are found.

When the waveform is optimal (as shown in the first part of FIG. 3), this technique is simple and economic. However, when the waveform is not optimal, many errors will occur due to false triggering. The quality of the waveform and its associated errors fall into three areas (also shown in FIG. 3):

Area I: Lack of amplitude.

The wave-form in this area exhibits shouldering and is primarily composed of the sum of the fundamental frequency, f, and its 3rd harmonic, 3 f. The frequency response of the amplifier and particularly the linearity of its phase response further affect the shape. The read damping, optimized to the 2 f frequency, will tend to cause over-shoot leading to false peaks at lower frequencies.

Area II: Double peaking close to each other.

Overrange signals in this area are clipped, resulting in peak-distortion, or ringing. This, combined with non-linearity in the amplitude and phase responses, will shift the peak and deteriorate the error margin. This can result in an unacceptable multi-triggering output.

Area III: High frequency spiking noise.

This area is characterized by high energy spikes. These can come from several sources, such as surface defects (e.g. dirt or dents on the disk) read back and passed through a poorly designed band-pass filter. Other sources could be substrate interference or feed-through from digital circuitry on the same chip. Electrical or magnetic spikes can also be received through the package leads, especially at differential pins. As long as it has sufficient energy, a spike can produce two spurious pulses.

The errors produced as discussed above are typically dealt with by requiring each peak to be of a minimum amplitude before it is considered data. Such a system is shown in U.S. Pat. No. 4,081,756 to Price et al. Besides the basic detection circuitry, this method qualifies the peaks depending on whether their magnitudes are above a certain threshold with a threshold comparator 22 as shown in FIG. 1. Threshold comparator 22 has hysteresis and has a toggle output which changes according to whether the peak has sufficient amplitude to pass through either the positive or negative threshold from the zero level. Data latch 18 following the comparator thus uses its output to gate through only one pulse per peak cycle to prevent multi-triggering in Areas I and II. However, in Area III short spikes may still have sufficient amplitude to cause false triggering.

Another possible method for eliminating erroneous peaks would be to use time domain filtering. This method would qualify the signal peaks by insuring that there is a minimum period between them. After the zero-crossing detector the signal can be delayed with respect to itself and used to clock the data latch. Only peaks with sufficient spacing will pass through. Thus, those in Area III will be screened. Area II-type ringing peaks will be screened as long as the ringing has settled within the delay period. However, this method will not be effective enough to guarantee the screening of distorted waveforms such as those in Area I despite their normally small amplitude.

SUMMARY OF THE INVENTION

The present invention is a magnetic recording pulse detection circuit using a combination of amplitude and time qualification. An input signal is provided to a peak detecting circuit and to a comparator for comparing the input signal to a threshold level. A time delay circuit is also provided so that a peak detection output signal is provided only if the peak exceeds the threshold value and there has been no additional peak for a predetermined period of time.

In the preferred embodiment, a differential input signal is amplified, filtered and supplied to a differentiator. The output of the differentiator is supplied to a zero-crossing detector which provides its positive output to the data input of a latching flip-flop. In addition to being supplied to the differentiator, the input signal is provided to a pair of comparators for comparison with a positive and a negative threshold voltage. The output of these comparators are each provided to an input of an AND gate, with the other input of the AND gates being provided from the negative and positive outputs of the zero-crossing comparator, respectively. The two AND gate outputs are ORed together to produce an output signal indicating that the input signal meets the amplitude qualification. This output signal is then provided to a one-shot to provide a time delay, with the output of the one-shot being provided to the clock input of the latching flip-flop. This one-shot thus insures that only a single peak will be indicated for each period having a length of time equal to the one-shot delay. The output of the latching flip-flop is provided to a pulse generator which gives a pulsed output indicating the detection of a data pulse.

The present invention thus yields an improved peak detection circuit by uniquely combining an amplitude qualification circuit with a time qualification circuit. For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram of a pulse detection circuit using amplitude qualification according to the prior art;

FIG. 2 is a block diagram of a preferred embodiment of the present invention using both amplitude and time qualification;

FIG. 3 is a timing diagram of the signals produced in the circuit of FIG. 2; and FIG. 4 is a more detailed block diagram of the embodiment of FIG. 2 including an automatic gain control loop.

DETAILED DESCRIPTION OF THE PREFERRED EMBODIMENTS

FIG. 2 shows a read head 24 coupled to a preamplifier 26. The output of amplifier 26 is coupled to a filter 28. Filter 28 is coupled to a differentiator 30 and to positive and negative threshold comparators 32 and 34, respectively. The output of differentiator 30 is coupled to a zero-crossing detector 36, which has a positive output coupled to the data input of a latching flip-flop 38.

Threshold amplifiers 32 and 34 are provided with a voltage threshold by resistors 40, 42. The output of positive and negative threshold comparators 32, 34 are provided to AND gates 44, 46. The other inputs to AND gates 44 and 46 are the negative and positive outputs of zero-crossing detector 36. Thus, one of the AND gates will provide a high level output when a zero-crossing is detected and a threshold is exceeded in the same direction.

OR gate 48 provides a positive output when either of AND gates 44, 46 provide a positive output. The output of OR gate 48 is coupled to a one-shot delay circuit 50. One shot delay 50 provides a delay after a peak is detected before clocking a clock input of latching flip-flop 38. This delay is preferably one-fourth the frequency of the data which is being detected. Thus, a peak will not be clocked unless no other peaks are detected within a period of time equal to one-fourth the frequency of the data after the initial peak is detected. When a peak is detected, the output of flip-flop 38 will be provided to a pulse generator 52 to provide a data pulse indicating the presence of a data peak.

FIG. 3 is a timing diagram of the various signals indicated in FIG. 2. As can be seen, in Area I, the detected signal has insufficient amplitude to pass the voltage threshold and thus no peaks are indicated as a result of the zero-crossings. In Area II, the time delay insures that only one of the multiple peaks detected is passed through. In Area III, the short spikes have insufficient duration to qualify because of the time period set by one-shot delay 50. As can be seen, the input data thus matches the output data with a delay relative to the input data which can be varied as desired by varying the filter delay.

FIG. 4 shows the embodiment of FIG. 2 incorporated into a circuit which includes automatic gain control and an adaptive threshold adjustment. A read head 76 provides an input signal in differential form to a preamplifier 78 which is then provided to a transconductance amplifier 80. The signal then proceeds through transresistance amplifier 82 and, in a first channel, to a filter 84, differentiator 86 and a zero-crossing comparator 88. A second channel provides the signal from amplifier 82 to a filter 90 and a voltage buffer 92 and then to positive and negative threshold comparators 94 and 96. The outputs of these two comparators are provided to AND gates 106 and 108, OR gate 110 and one-shot 112 in the same manner as in FIG. 2. The output of one-shot 112 is provided to the clock input of latching flip-flop 114. Flip-flop 114 receives its data input from zero-crossing comparator 88. The output of flip-flop 114 is provided to a one-shot 116 to provide the pulse output indicating a data 1.

Automatic gain control is provided by a full wave rectifier 118 receiving the signal from voltage buffer 92 and providing the signal to a comparator 128. Comparator 128 is a part of automatic gain control circuit 130 which compares the rectified voltage to an automatic gain control voltage, VAGC. The output of comparator 128 is provided to an integrator 132 and then to a controlled current source 135 which provides a current level to gain modified amplifier 80 to modify the gain of the amplifier.

The circuit of FIG. 4 also provides an adaptive threshold adjustment through the use of comparators 120, 122, adaptive threshold adjustment logic 124, controlled current source 102 and resistors 98 and 100. This circuitry provides that, for each peak, a lower threshold value (0.5 VSH) will be used when the rectified signal exceeds a first qualifying level (VSH) and the threshold will be set to a higher level (VSH) when the rectified signal exceeds a higher qualifying level (0.8 VAGC). The operation of this circuit is discussed in more detail in copending application Ser. No. 029,310, filed Mar. 28, 1987.

As will be understood by those familiar with the art, the present invention may be embodied in other specific forms without departing from the spirit or essential characteristics thereof. For example, the timing delay could be done a number of ways, such as by logic which would be coupled to the output of flip-flop 38 of FIG. 2 to prevent it from triggering pulse generator 52 for a predetermined period of time after a last amplitude-qualified peak is detected. Accordingly, the disclosure of the preferred embodiments of the invention is intended to be illustrative, but not limiting, of the scope of the invention which is set forth in the following claims.

What is claimed is:

1. A pulse detection circuit comprising:
   means for detecting peaks in an input signal and producing a peak detect signal when a peak is detected;
   means for comparing said input signal to a threshold level;
   means, coupled to said means for detecting and said means for comparing, for producing an amplitude qualified peak output signal when a peak is detected above said threshold level; and
   means, having an input coupled to said means for producing an amplitude qualified peak output signal, and said means for detecting peaks, for producing a time qualified peak signal at an output after a predetermined delay from said amplitude qualified output signal if said peak detect signal is still present after said delay, said means for producing a time qualified peak signal being nonresponsive to signals at said input during said delay.

2. The apparatus of claim 1 wherein said means for detecting peaks includes a differentiator coupled to receive said input signal and a zero-crossing comparator coupled to an output of said differentiator, an output of said comparator producing said peak detect signal.

3. The apparatus of claim 2 wherein said input signal is a differential signal coupled across first and second input lines and said means for comparing includes a negative threshold comparator having a first input coupled to a first one of said input lines and a second input coupled to a first threshold voltage and a positive threshold comparator having a first input coupled to a second one of said input lines and a second input coupled to a second threshold voltage.

4. The apparatus of claim 3 wherein said means for producing a qualified peak output signal is a latching flip-flop having a data input coupled to a positive output of said zero-crossing comparator and further comprising:
  a first AND gate having a first input coupled to an output of said negative threshold comparator and a second input coupled to a positive output of said zero-crossing comparator;
  a second AND gate having a first input coupled to an output of said positive threshold comparator and a second input coupled to a negative output of said zero-crossing comparator;
  an OR gate having first and second inputs coupled to outputs of said negative and positive threshold comparators, respectively, and an output coupled to a clock input of said flip-flop.

5. The apparatus of claim 4 wherein said means for producing a time qualified peak signal comprises a one-shot delay circuit coupled between said OR gate output and said clock input of said flip-flop.

6. The apparatus of claim 1 further comprising a pre-amplifier and a filter for conditioning said input signal and presenting said input signal to said means for detecting peaks.

7. The apparatus of claim 1 wherein said means for producing a time qualified peak signal comprises:

a one-shot delay circuit having an input coupled to said means for producing an amplitude qualified peak output signal; and
a flip-flop having one input coupled to said means for detecting peaks and another inut coupled to an output of said one-shot delay circuit.

8. A pulse detection circuit comprising:
a differentiator coupled to receive an input signal, said input signal being a differential signal coupled across first and second input lines;
a zero-crossing comparator coupled to an output of said differentiator;
a negative threshold comparator having a first input coupled to a first one of said input lines and a second input coupled to a first threshold voltage;
a positive threshold comparator having a first input coupled to a second one of said input lines and a second input coupled to a second threshold voltage;
a first AND gate having a first input coupled to an output of said negative threshold comparator and a second input coupled to a positive output of said zero-crossing comparator;
a second AND gate having a first input coupled to an output of said positive threshold comparator and a second input coupled to a negative output of said zero-crossing comparator;
an OR gate having first and second inputs coupled to outputs of said negative and positive threshold comparators, respectively;
a one-shot delay circuit having an input coupled to an output of said OR gate;
a latching flip-flop having a data input coupled to a positive output of said zero-crossing comparator and a clock input coupled to an output of said one-shot delay circuit.

9. A pulse detection method comprising:
detecting peaks in an input signal and producing a peak detect signal when a peak is detected;
comparing said input signal to a threshold level;
producing a qualified peak output signal when a peak is detected above said threshold level; and
disabling said output signal for a predetermined period of time after a peak is detected.

10. The method of claim 9 wherein said detecting step includes the steps of differentiating said input signal to produce a differentiated signal and detecting the zero-crossings of said differentiated signal.

* * * * *